United States Patent
Xi et al.

(10) Patent No.: US 11,651,228 B2
(45) Date of Patent: May 16, 2023

(54) DUAL-MOMENTUM GRADIENT OPTIMIZATION WITH REDUCED MEMORY REQUIREMENTS

(71) Applicant: Microsoft Technology Licensing, LLC, Redmond, WA (US)

(72) Inventors: Jinwen Xi, Sunnyvale, CA (US); Bharadwaj Pudipeddi, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 16/851,847

(22) Filed: Apr. 17, 2020

(65) Prior Publication Data
US 2021/0326711 A1 Oct. 21, 2021

(51) Int. Cl.
*G06N 20/00* (2019.01)
*G06N 3/084* (2023.01)
*G06N 3/063* (2023.01)
*G06N 5/046* (2023.01)

(52) U.S. Cl.
CPC .............. *G06N 3/084* (2013.01); *G06N 3/063* (2013.01); *G06N 5/046* (2013.01); *G06N 20/00* (2019.01)

(58) Field of Classification Search
CPC ........ G06N 3/084; G06N 20/00; G06N 3/063; G06N 5/046
USPC ........................................................ 706/25
See application file for complete search history.

(56) References Cited

U.S. PATENT DOCUMENTS

| 10,769,528 | B1* | 9/2020 | Wang | G06N 3/04 |
| 2017/0372202 | A1* | 12/2017 | Ginsburg | G06N 3/0454 |
| 2019/0034784 | A1* | 1/2019 | Li | G06N 3/0454 |
| 2020/0012936 | A1* | 1/2020 | Lee | G06N 3/04 |
| 2020/0090031 | A1* | 3/2020 | Jakkam Reddi | G06N 3/08 |
| 2020/0380369 | A1* | 12/2020 | Case | G06N 3/063 |
| 2021/0034968 | A1* | 2/2021 | Kim | G06N 3/08 |

OTHER PUBLICATIONS

Kingma, Diederik, et al., "Adam: A Method for Stochastic Optimization," arXiv:1412.6980v9, Jan. 30, 2017, 15 Pages.

(Continued)

*Primary Examiner* — Jin Ge
(74) *Attorney, Agent, or Firm* — Ranjeev Singh; Singh Law, PLLC

(57) ABSTRACT

Systems and methods related to dual-momentum gradient optimization with reduced memory requirements are described. An example method in a system comprising a gradient optimizer and a memory configured to store momentum values associated with a neural network model comprising L layers is described. The method includes retrieving from the memory a first set of momentum values and a second set of momentum values, corresponding to a layer of the neural network model, having a selected storage format. The method further includes converting the first set of momentum values to a third set of momentum values having a training format associated with the gradient optimizer and converting the second set of momentum values to a fourth set of momentum values having a training format associated with the gradient optimizer. The method further includes performing gradient optimization using the third set of momentum values and the fourth set of momentum values.

20 Claims, 10 Drawing Sheets

(56) References Cited

OTHER PUBLICATIONS

"International Search Report and Written Opinion Issued in PCT Application No. PCT/US2021/017215", dated Jun. 9, 2021, 26 Pages.
Ruder, Sebastian, "An Overview of Gradient Descent Optimization Algorithms", In repository of arXiv:1609.04747, Jun. 15, 2017, 14 Pages.

* cited by examiner

```
┌─────────────────────────────────────────────────────────────────────────┐
│ RETRIEVING FROM A MEMORY A FIRST SET OF MOMENTUM VALUES, CORRESPONDING  │
│ TO A LAYER OF A NEURAL NETWORK MODEL, HAVING A SELECTED STORAGE FORMAT  │
│ AND RETRIEVING FROM THE MEMORY A SECOND SET OF MOMENTUM VALUES,         │
│ CORRESPONDING TO THE LAYER OF THE NEURAL NETWORK MODEL, HAVING THE      │
│ SELECTED STORAGE FORMAT                                                 │
└─────────────────────────────────────────────────────────────────────────┘
                                    │  1010
                                    ▼
┌─────────────────────────────────────────────────────────────────────────┐
│ CONVERTING THE FIRST SET OF MOMENTUM VALUES HAVING THE SELECTED STORAGE │
│ FORMAT TO A THIRD SET OF MOMENTUM VALUES HAVING A TRAINING FORMAT       │
│ ASSOCIATED WITH THE GRADIENT OPTIMIZER AND CONVERTING THE SECOND SET OF │
│ MOMENTUM VALUES HAVING THE SELECTED STORAGE FORMAT TO A FOURTH SET OF   │
│ MOMENTUM VALUES HAVING A TRAINING FORMAT ASSOCIATED WITH THE GRADIENT   │
│ OPTIMIZER                                                               │
└─────────────────────────────────────────────────────────────────────────┘
                                    │  1020
                                    ▼
┌─────────────────────────────────────────────────────────────────────────┐
│ USING A GRADIENT OPTIMIZER, PERFORMING GRADIENT OPTIMIZATION USING THE  │
│ THIRD SET OF MOMENTUM VALUES AND THE FOURTH SET OF MOMENTUM VALUES      │
└─────────────────────────────────────────────────────────────────────────┘
                                    │  1030
                                    ▼
┌─────────────────────────────────────────────────────────────────────────┐
│ GENERATING A FIFTH SET OF MOMENTUM VALUES AND SIXTH SET OF MOMENTUM     │
│ VALUES FOR A NEXT ITERATION OF GRADIENT OPTIMIZATION                    │
└─────────────────────────────────────────────────────────────────────────┘
                                    │  1040
                                    ▼
┌─────────────────────────────────────────────────────────────────────────┐
│ CONVERTING THE FIFTH SET OF MOMENTUM VALUES INTO A SEVENTH SET OF       │
│ MOMENTUM VALUES HAVING THE STORAGE FORMAT BY STORING ONLY THE SIGN BIT  │
│ AND TRUNCATING A PREDETERMINED NUMBER OF BITS ASSOCIATED WITH A         │
│ MANTISSA OF THE FIFTH SET OF MOMENTUM VALUES                            │
└─────────────────────────────────────────────────────────────────────────┘
                                    │  1050
                                    ▼
┌─────────────────────────────────────────────────────────────────────────┐
│ CONVERTING THE SIXTH SET OF MOMENTUM VALUES INTO AN EIGHTH SET OF       │
│ MOMENTUM VALUES HAVING THE STORAGE FORMAT BY STORING ONLY THE SIGN BIT  │
│ AND TRUNCATING THE PREDETERMINED NUMBER OF BITS ASSOCIATED WITH A       │
│ MANTISSA OF THE SIXTH SET OF MOMENTUM VALUES                            │
└─────────────────────────────────────────────────────────────────────────┘
                               1000              1060
```

*FIG. 10*

DUAL-MOMENTUM GRADIENT OPTIMIZATION WITH REDUCED MEMORY REQUIREMENTS

BACKGROUND

Trained models, including neural network models, are used to perform complex tasks such as reading comprehension, language translation, image recognition, or speech recognition. Machine learning services, such as those based on Natural Language Processing (NLP), Recurrent Neural Networks (RNNs), Convolution Neural Networks (CNNs), Long Short Term Memory (LSTM) neural networks, or Gated Recurrent Units (GRUs) have been deployed to perform such complex tasks. While these types of models have been trained using various architectures and methods, there is a need for continued improvement in the underlying architectures and methods to perform training.

SUMMARY

In one example, the present disclosure relates to a method in a system comprising a gradient optimizer and a memory configured to store momentum values associated with a neural network model comprising L layers, where L is an integer greater than one. The method may include retrieving from the memory a first set of momentum values, corresponding to a layer of the neural network model, having a selected storage format and retrieving a second set of momentum values from the memory, corresponding to the layer of the neural network model, having the selected storage format. The method may further include converting the first set of momentum values having the selected storage format to a third set of momentum values having a training format associated with the gradient optimizer and converting the second set of momentum values having the selected storage format to a fourth set of momentum values having a training format associated with the gradient optimizer. The method may further include using the gradient optimizer, performing gradient optimization using the third set of momentum values and the fourth set of momentum values.

In another example, the present disclosure relates to a system including a gradient optimizer. The system may include a memory configured to store momentum values associated with a neural network model comprising L layers, where L is an integer greater than one. The system may be configured to: (1) retrieve from the memory a first set of momentum values, corresponding to a layer of the neural network model, having a selected storage format and retrieve a second set of momentum values from the memory, corresponding to the layer of the neural network model, having the selected storage format, (2) convert the first set of momentum values having the selected storage format to a third set of momentum values having a training format associated with the gradient optimizer and converting the second set of momentum values having the selected storage format to a fourth set of momentum values having a training format associated with the gradient optimizer, and (3) using the gradient optimizer, perform gradient optimization using the third set of momentum values and the fourth set of momentum values.

In yet another example, the present disclosure relates to a method in a system comprising a gradient optimizer and a memory configured to store weights and momentum values associated with a neural network model comprising L layers, where L is an integer greater than one. The method may further include retrieving from the memory a first set of momentum values, corresponding to a layer of the neural network model, having a selected storage format and retrieving from the memory a second set of momentum values, corresponding to the layer of the neural network model, having the selected storage format. The method may further include converting the first set of momentum values having the selected storage format to a third set of momentum values having a training format associated with the gradient optimizer and converting the second set of momentum values having the selected storage format to a fourth set of momentum values having a training format associated with the gradient optimizer. The method may further include using the gradient optimizer, performing gradient optimization using the third set of momentum values and the fourth set of momentum values. The method may further include generating a fifth set of momentum values and a sixth set of momentum values for a next iteration of gradient optimization. The method may further include converting the fifth set of momentum values into a seventh set of momentum values having the storage format by storing only the sign bit and truncating a predetermined number of bits associated with a mantissa of the fifth set of momentum values. The method may further include converting the sixth set of momentum values into an eighth set of momentum values having the storage format by storing only the sign bit and truncating the predetermined number of bits associated with a mantissa of the sixth set of momentum values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 10 shows a flow diagram of another method for a dual-momentum gradient optimizer (DMGO) in accordance with one example.

DETAILED DESCRIPTION

Figure 1:
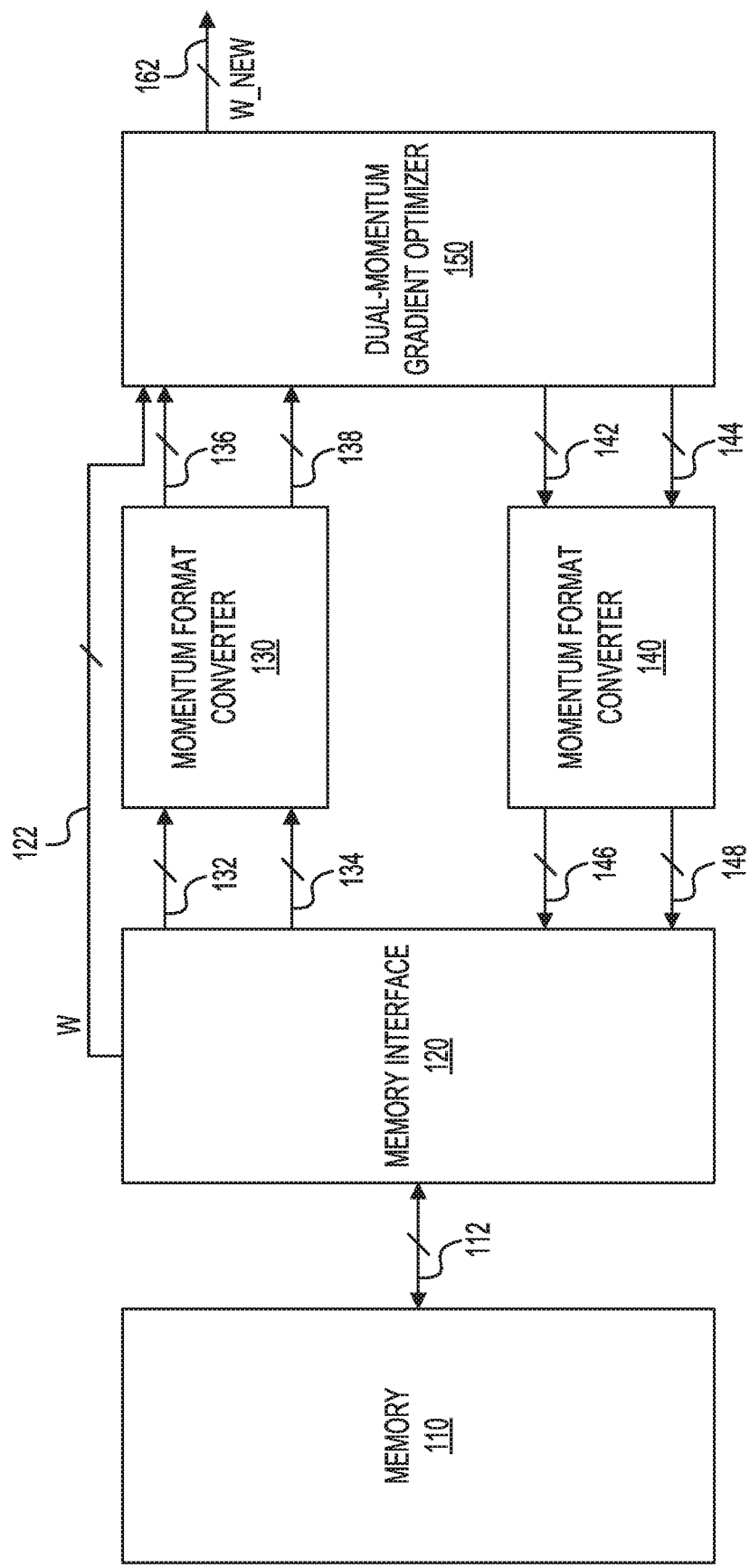
FIG. 1 shows an artificial intelligence training system (AITS) including a dual-momentum gradient optimizer (DMGO) in accordance with one example.

Examples disclosed in the present disclosure relate to dual-momentum gradient optimization with reduced memory requirements. Certain examples relate to distributed training of models, including neural network models, that require less memory. In certain example training systems, each worker (e.g., a GPU, a DSP, or an ASIC accelerator) takes a subset of the training data (e.g., a mini-batch) and computes the gradients, which are further averaged/reduced to update the model's parameters (e.g., weights). Weight updates are applied after the backpropagation step, which calculates the gradients. As an example, the gradient of a loss function with respect to the weights in the network (or a portion of the network) is calculated. The gradient is then fed to an optimization method that uses the gradient to update the weights to minimize the loss function. The goal with backpropagation is to update each of the weights (or at least some of the weights) in the network so that they cause the actual output to be closer to the target output, thereby minimizing the error for each output neuron and the network as a whole.

In certain examples, the trained models can be deployed in cloud computing environments. Cloud computing may refer to a model for enabling on-demand network access to a shared pool of configurable computing resources.

For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Various machine learning services such as those based on Recurrent Neural Networks (RNNs), Convolution Neural Networks (CNNs), Long Short Term Memory (LSTM) neural networks, or Gated Recurrent Units (GRUs) may be implemented using the examples described in this disclosure. In one example, the service-related content or other information, such as words, sentences, images, videos, or other such content/information, may be translated into a vector representation. The vector representation may correspond to techniques such as RNN, CNN, LSTM, or GRU. In one example, the neural network model may comprise of many layers and each layer may be encoded as matrices or vectors of weights expressed in the form of coefficients or constants that have been obtained via off-line training of a neural network.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi} x_t + W_{hi} h_{t-1} + W_{ci} c_{t-1} + b_i)$$

$$f_t = \sigma(W_{xf} x_t + W_{hf} h_{t-1} + W_{cf} c_{t-1} + b_f)$$

$$c_t = f_t c_{t-1} + i_t \tan h(W_{xc} x_t + W_{hc} h_{t-1} + b_c)$$

$$o_t = \sigma(W_{xo} x_t + W_{ho} h_{t-1} W_{co} c_t + b_o)$$

$$h_t = o_t \tan h(c_t)$$

In this example, inside each LSTM layer, the inputs and hidden states may be processed using a combination of vector operations (e.g., dot-product, inner product, or vector addition) and non-linear functions (e.g., sigmoids, hyperbolic, and tangents). In certain cases, the most compute intensive operations may arise from the dot products, which may be implemented using dense matrix-vector and matrix-matrix multiplication routines. In one example, the processing of the vector operations and non-linear functions may be performed in parallel.

A gradient optimizer is one of the key components in training systems used for artificial intelligence. A gradient optimizer is designed to apply the gradients on the model parameters (weights) to update the model so that the next iteration's prediction can be closer to the ground truth. Certain examples of the present disclosure relate to AI training frameworks that support a dual-momentum gradient optimizer, where two single-precision (FP32) momentums are buffered along with model parameters. Each updating step calculates the new momentum values, which are then used to generate the new weight. Both new momentum values and the new weights are stored for the next iteration. As an example, the dual-momentum Adaptive Moment Estimation (Adam) algorithm can be represented by the following equations:

$$v_t := \beta_1 \cdot v_t + (1 - \beta_1) \cdot dw$$

$$s_t := \beta_2 \cdot s_t + (1 - \beta_2) \cdot dw^2$$

$$w := w - \frac{\alpha v_t}{\sqrt{s_t} + \epsilon}$$

where $v_t$, $s_t$ are the two momentums, w is the model weight, dw is the gradient, $\alpha$ is the initial learning rate, and $\epsilon$ is a tiny value for better numerical stability.

Advantageously, the use of a dual-momentum optimizer may get the neural network model to converge faster than zero/single-momentum optimizers such as SGD (Stochastic Gradient Descent). However, the use of the dual-momentum optimizer may require at least twice as much memory as the memory required by zero/single-momentum optimizers to buffer the momentums other than the model weight. This trend may become severe especially for large models containing millions or billions of parameters. If the optimizer runs on memory-limited GPU/ASIC, the memory space claimed by the optimizer adversely reduces the maximum batch size. On the other side, relocating the optimizer to the host CPU may resolve the memory size bottleneck. However, the memory bandwidth bottleneck may slow down the optimizer since the processor needs to fetch an extra two FP32 momentums from memory for each weight/gradient pair and store them back.

In addition, the buffering of the entire model's gradients requires a very large amount of memory considering that models such as the Bidirectional Encoder Representations from Transformers (BERT)-large model has 1.36 gigabytes (GBs) of gradients generated per worker. In the context of this model, 5.44 GB of memory is required to buffer the gradients in a four-worker training cluster. The need for memory increases linearly with the number of workers. Moreover, the memory requirements for each worker may be three times the memory required for BERT when used with algorithms such as Adaptive Moment Estimation (Adam), which requires buffering of two floating point 32-bit (FP32) momentum terms per gradient.

FIG. 1 shows an artificial intelligence training system (AITS) 100 including a dual-momentum gradient optimizer (DMGO) 150 in accordance with an example. AITS 100 may include a memory 110 (e.g., a DRAM or another type of memory), a memory interface 120 (e.g., a DDR interface or another type of interface), momentum format converter (MFC) 130, another momentum format converter (MFC) 140, and DMGO 150. Memory 110 may be coupled via bus 112 to memory interface 120. Alternatively, memory 110 may be integrated with memory interface 120 via a chip-on-chip package, a system-in-chip package, a 3D-memory system, a stacked die system. Memory interface 120 may be coupled via a bus 122 to DMGO 150 such that model weights (W) may be transferred from memory 110 to DMGO 150 via memory bus 122. Memory interface 120 may be coupled to MFC 130 via busses 132 and 134. Bus 132 may be used to transfer storage format momentum values associated with a first momentum (e.g., vt_fp8 format) from memory 110 to MFC 130. Bus 134 may be used to transfer storage format momentum values associated with a second momentum (e.g., st_fp8 format) from memory 110 to MFC 130. In one example, storage format may correspond to an 8-bit reduced-precision format for the momentum values. MFC 130 may be configured to process both the first momentum values and the second momentum values to change their format from the storage format to a training format associated with DMGO 150. In one example, the training format may correspond to full 32-bit single-precision format.

MFC 130 may further be configured to transmit the first and the second momentum values to DGO 150 via bus 136 and bus 138, respectively. In this example, MFC 140 may be coupled via busses 142 and 144 to DMGO 150. MFC 140 may further be coupled to memory interface 110 via busses 146 and 148. MFC 140 may convert the momentum values from the training format to the storage format.

Still referring to FIG. 1, AITS 100 may allow the implementation of a new method to use reduced precision momentums for Adam, without introducing any performance degradation. As an example, the dual-momentum Adam algorithm can be represented by the following equations:

$$v_t := \beta_1 \cdot v_t + (1 - \beta_1) \cdot dw$$

$$s_t := \beta_2 \cdot s_t + (1 - \beta_2) \cdot dw^2$$

-continued $$w := w - \frac{\alpha v_t}{\sqrt{s_t} + \epsilon}$$

where $v_t$, $s_t$ are the two momentums, w is the model weight, dw is the gradient, $\alpha$ is the initial learning rate, and $\epsilon$ is a tiny value for better numerical stability. In one example, one of the momentum values ($v_t$) may correspond to the expectation for the gradient values and the other one of the momentum values ($s_t$) may correspond to the expectation values for the variance in the gradient values. In this example, instead of using the full 32-bit single-precision momentums, only 8 bits are used: 1-bit for the sign, and 7 bits for the dynamic range of momentums $\{v_t, s_t\}$. In this example, because both $v_t$, $s_t$ are less than 1.0 due to the multiplication with $(1-\beta)$, where $\beta$ is the value close to 1.0, the most-significant bit (MSB) of their 8-bit exponents is constant zero and can be safely discarded before the storage. In this example, although the storage format for the momentum values is 8-bit, the calculation format is still higher precision to achieve higher accuracy. Although FIG. 1 shows AITS 100 including a certain number of components, arranged in a certain manner, AITS 100 may include additional or fewer components arranged differently. As an example, MFC 130 and MFC 140 may be integrated with DMGO 150 via a chip-on-chip package, a system-in-chip package, a 3D-memory system, a stacked die system. Alternatively, MFC 130 and MFC 140 may be integrated with DMGO 150 on the same chip (e.g., as a system-on-chip (SoC). In another example, each of memory 110, memory interface 120, MFC 130, MFC 140, and DMGO 150 may be integrated via a chip-on-chip package, a system-in-chip package, a 3D-memory system, a stacked die system.

Figure 2:
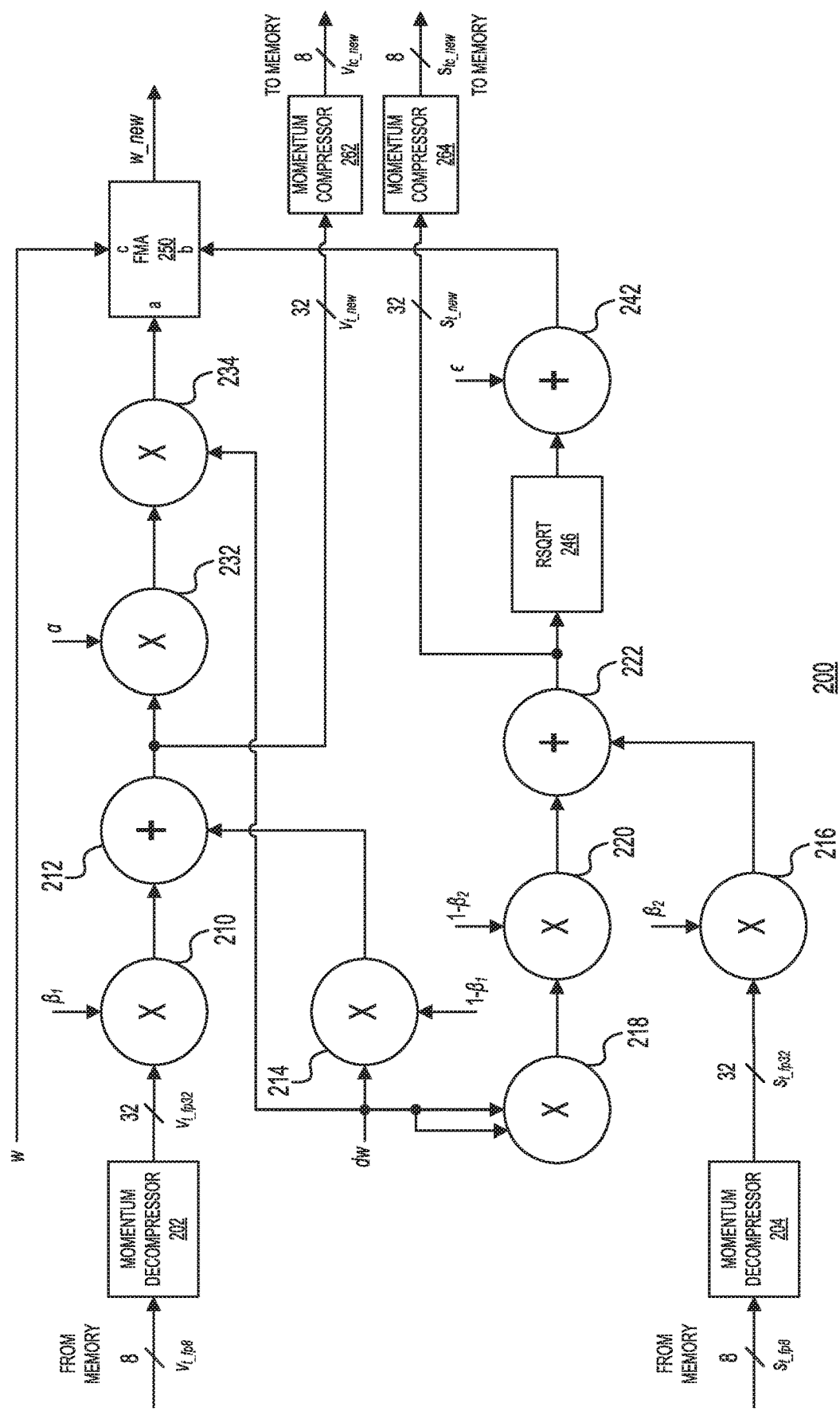
FIG. 2 shows a dual-momentum gradient optimizer (DMGO) in accordance with one example.

FIG. 2 shows a dual-momentum gradient optimizer (DMGO) 200 in accordance with one example. DMGO 200 may include a momentum decompressor 202 and another momentum decompressor 204. DMGO 200 may further include a momentum compressor 262 another momentum compressor 264. DMGO 200 may further include logic configured to perform various operations associated with implementing the dual-momentum Adaptive Moment Estimation (Adam) algorithm. In this example, momentum decompressor 202 and momentum decompressor 204 may be used to provide similar functionality as described earlier with respect to MFC 130 of FIG. 1. Similarly, momentum compressor 262 and momentum compressor 264 may be used to implement similar functionality as described earlier with respect to MFC 140 of FIG. 1. Momentum values associated with a first momentum (e.g., $v_{t\_fp8}$) may be obtained from memory and provided to momentum decompressor 202. Momentum values associated with a second momentum (e.g., $s_{t\_fp8}$) may be obtained from memory and provided to momentum decompressor 204. In one example, the momentum values may have a storage format (e.g., an 8-bit reduced-precision format). Momentum decompressor 202 may be configured to process the first momentum values to change their format from the storage format to a training format associated with DMGO 200. Momentum decompressor 204 may be configured to process the second momentum values to change their format from the storage format to a training format associated with DMGO 200.

With continued reference to FIG. 2, the logic included as part of DMGO 200 may include logic configured to perform operations, such as addition, multiplication, and fused multiply-add operations. The logic may be configured to implement a dual-momentum optimization algorithm (e.g., dual-momentum Adaptive Moment Estimation (Adam) algorithm). As an example, the calculations corresponding to the dual-momentum Adam algorithm with respect to the calculation of new momentum values ($v_{t\_new}$, $s_{t\_new}$) can be represented by the following equations:

$$v_{t\_new} := \beta_1 \cdot v_{t\_fp32} + (1 - \beta_1) \cdot dw$$

$$s_{t\_new} := \beta_2 \cdot s_{t\_fp32} + (1 - \beta_2) \cdot dw^2$$

$$w := w - \frac{\alpha v_t}{\sqrt{s_t} + \epsilon}$$

where $v_{t\_new}$, $s_{t\_new}$ are the new momentum values, w is the model weight, dw is the gradient, $\alpha$ is the initial learning rate, and $\epsilon$ is a tiny value used for better numerical stability. Thus, in this example, momentum decompressors 202 and 204 convert the storage format (e.g., 8-bit compressed format) of the respective momentum values ($v_{t\_fp8}$, $s_{t\_fp8}$), to a training format (e.g., 32-bit full-precision format) associated with DMGO 200. As an example, prior to when the gradient optimization is performed, a momentum decompressor (e.g., momentum decompressor 202 or 204) will convert the compressed 8-bit momentum values back to 32-bit single-precision by inserting one "0" bit between the sign bit and the most-significant bit (MSB) of the exponent, and padding twenty-three "0" bits right after the least-significant bit (LSB) of the exponent. The padded bits need not be "0" bits. In one example, at least a small number of bits may be non-zero bits. As an example, two or three LSBs may be non-zero bits.

Still referring to FIG. 2, the logic associated with DMGO 200, including multipliers 210 and 214 and adder 212 may perform the computations associated with generating one of the new momentum values ($v_{t\_new}$). Similarly, the logic associated with DMGO 200, including multipliers 216, 218, and 218 and adder 222 may perform the computations associated with generating the other new momentum values ($s_{t\_new}$). In addition, in this example, before storing the new momentum values ($v_{t\_new}$, $s_{t\_new}$) back to the memory, momentum compressors 262 and 264 convert the format of the new momentum values from the training format to the storage format. The new momentum values ($v_{tc\_new}$, $s_{tc\_new}$) are shown as 8-bit storage format values in FIG. 2. In this example, each of momentum compressors 262 and 264 may be configured to remove the most-significant bit (MSB) of the exponent associated with the momentum values and truncate all of the 23 mantissa bits to convert the 32-bit full-precision momentum values ($v_{t\_new}$, $s_{t\_new}$) to 8-bit compressed momentum values ($v_{tc\_new}$, $s_{tc\_new}$), which will be stored in the memory. Alternatively, fewer than 23 mantissa bits may be truncated. Advantageously, the compression of the momentum values may reduce the buffer size required for storing the momentum values by four-times. In addition, the use of least-significant bit (LSB) truncation may reduce the precision without the loss of the training performance by introducing the same rounding error direction so that the errors can be cancelled by each other.

With continued reference to FIG. 2, DMGO 200 may further include logic configured to generating the new weight values (e.g., w_new). In this example, this logic may include multipliers 232 and 234, adder 242, reciprocal square root (RSQRT) 246, and fused multiply-add (FMA) 250. Although FIG. 2 shows DMGO 200 including a certain number of components arranged in a certain manner, DMGO 200 may include additional or fewer components arranged differently.

When momentums are compressed by the momentum compressors, their precision bits are truncated to introduce the relative error of $\delta_1$ and $\delta_2$ with respect to the new momentum values (e.g., $v_{tc\_new}$ and $s_{tc\_new}$, respectively). In view of this, the gradient optimization equation can be re-written as:

$$w = w - \frac{\alpha \cdot vt(1-\delta_1)}{\sqrt{st(1-\delta_2)}} \approx w - \frac{\alpha \cdot vt}{\sqrt{st}} \cdot \frac{1-\delta}{\sqrt{1-\delta}} = w - \frac{\alpha \cdot vt}{\sqrt{st}}\sqrt{1-\delta}$$

For 32-bit single-precision numbers, $|\delta_1| \leq 2^{m-24}$, $|\delta_2| \leq 2^{m-24}$, where m is the number of precision bits truncated. In this example, one can safely approximate $1-\delta_1 = 1-\delta_2 \approx 1-\delta$ if m is not too big. The error bound can only be achieved when all the truncated m bits are "1"s, and this case can only rarely happen in real applications. Even so, if this extreme case happens, the instantaneous peak error may not negatively affect the overall performance. The relative error on the updated weights after truncating both momentums may be represented as: $\tau = 1 - \sqrt{1-\delta}$. For any $\delta \epsilon [0, 1)$, $\sqrt{1-\delta}$ will be closer to 1 than $1-\delta$ with small $\delta$ values. This indicates that reducing the precision on both momentums does not linearly reduce the precision of the updated parameters. This "square-root on error" effect compensates for some of the "precision-loss" due to the truncation.

Figure 3:
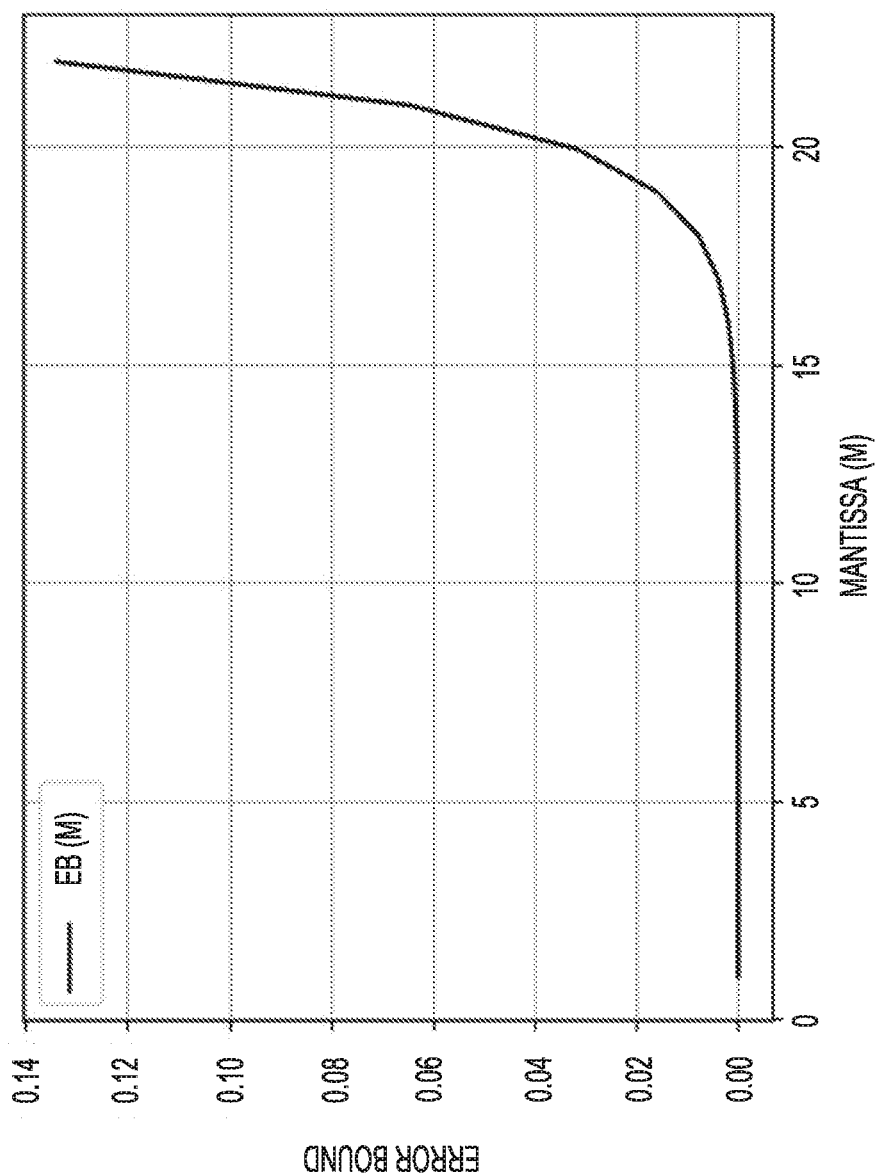
FIG. 3 shows a graph including the error bound curve (EB(M)) for weight update errors with the compressed momentum values being swept from the truncation of one mantissa bit to the truncation of twenty-three mantissa bits.

FIG. 3 shows a graph 300 the error bound curve (EB(M)) for weight update errors with the compressed momentum values being swept from the truncation of one mantissa bit to the truncation of twenty-three mantissa bits. As shown in graph 300, in this example, when the number of truncated mantissa bits is lower than sixteen, the error bound value is close to zero compared with the full single-precision (FP32) momentum values. In this example, the error bound increases rapidly when the number of truncated mantissa bits exceeds seventeen, with the maximum error bound of 0.13 when all of the mantissa bits have been truncated.

Figure 4:
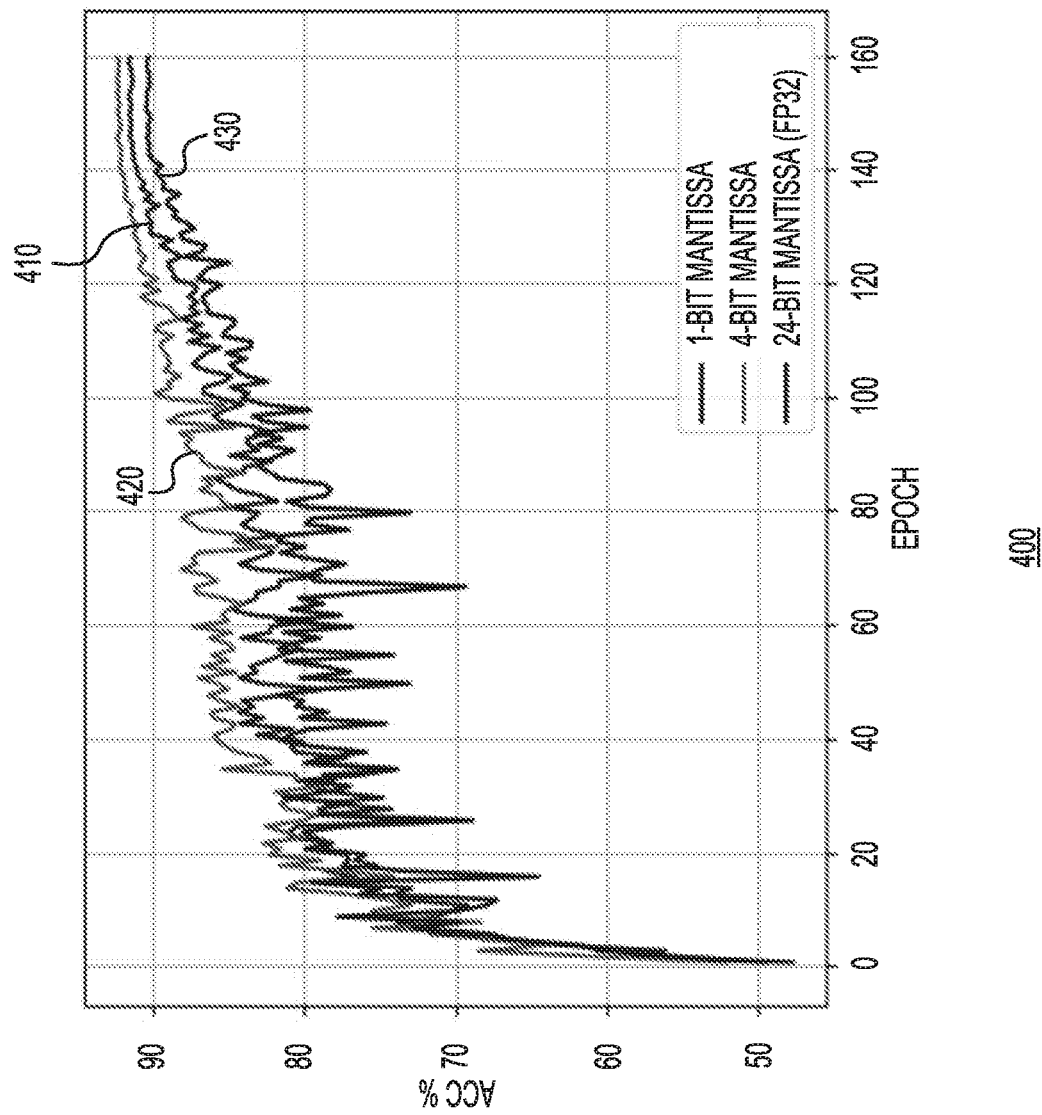
FIG. 4 shows a graph 400 with simulated convergence curves illustrating the effect of reduced-precision momentum values on the accuracy of training.

FIG. 4 shows a graph 400 with simulated convergence curves 410, 420, and 420 illustrating the effect of reduced-precision momentum values on the accuracy of training. As an example, simulated convergence curve 410 corresponds to 1-bit mantissa for the momentum values, simulated convergence curve 420 corresponds to 4-bit mantissa for the momentum values, and simulated convergence curve 430 corresponds to 24-bit mantissa for the momentum values. As is evident from the simulated convergence curves, the truncation of the mantissa bits for the momentum values does not degrade the performance with respect to the accuracy of the training. However, since the reduced precision momentum values save at least 50% of memory footprint, only half of the cycles for reading the memory may be required.

Figure 5:
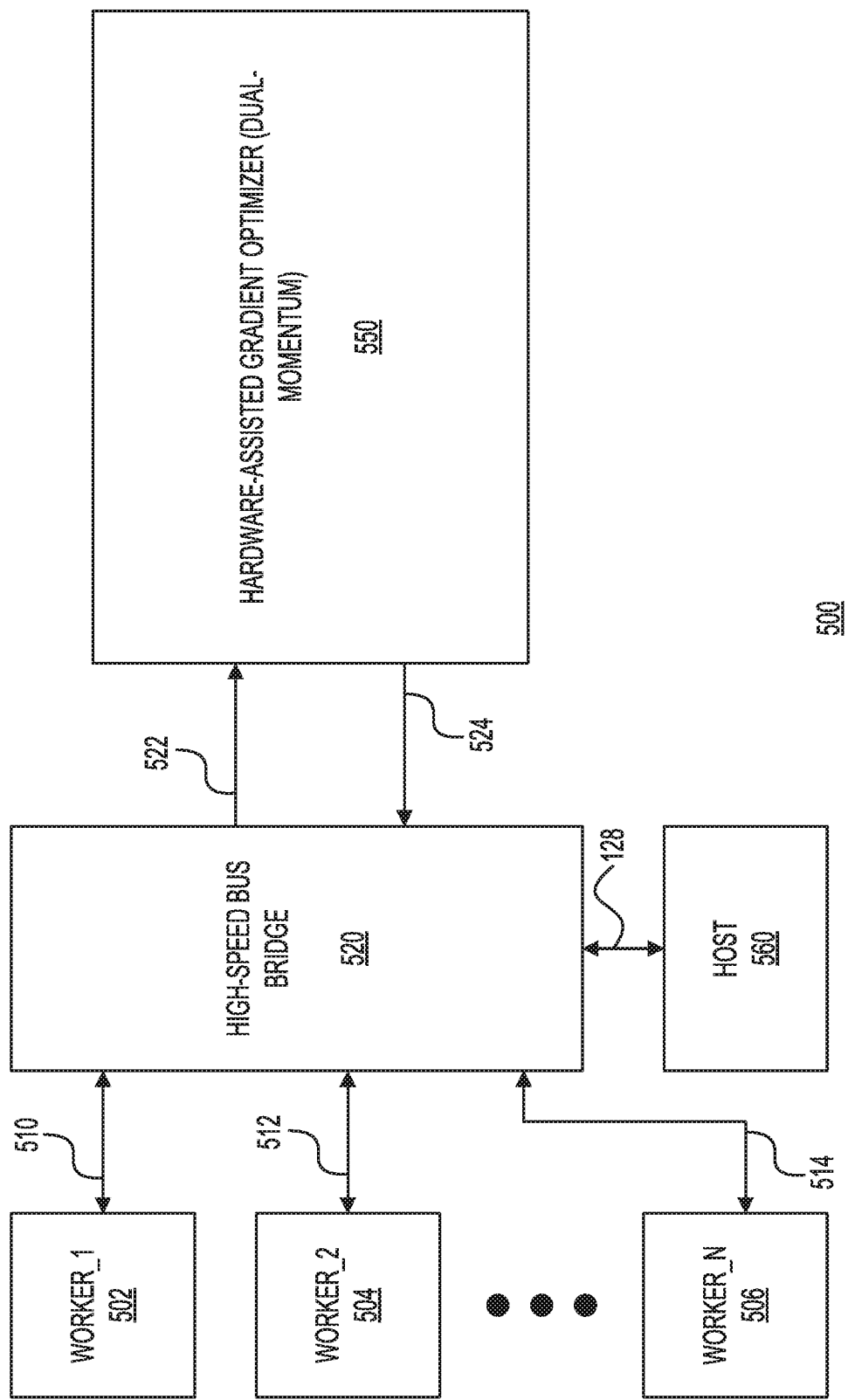
FIG. 5 shows a training system, including a hardware-assisted gradient optimizer (HAGO), in accordance with one example.

The techniques described as part of this disclosure may be implemented using a combination of hardware and/or software. In certain examples, DGMO 200 of FIG. 2 may be deployed as part of a training system 500, such as shown in FIG. 5. In this example, DGMO 200 may be included as part of a hardware-assisted gradient optimizer (dual-momentum) 550 (referred to as HAGO), for training a model, in accordance with one example. Gradient optimization system 500 may include a plurality of workers (e.g., WORKER_1 502, WORKER_2 504, and WORKER_N 506) coupled via a high-speed bus bridge 520 to HAGO 550. Each of the workers (e.g., WORKER_1 502, WORKER_2 504, and WORKER_N 506) may be implemented using any number of graphics processing units (GPUs), computer processing units (CPUs), memory (e.g., SRAM or other types of memory), field programmable gate arrays (FPGAs), Application Specific Integrated Circuits (ASICs), Erasable and/or Complex programmable logic devices (PLDs), Programmable Array Logic (PAL) devices, or Generic Array Logic (GAL) devices. Each worker may carry an entire copy of the neural network model that is being trained using gradient optimization system 500. Although each worker may carry the entire copy of the neural network model, each worker may operate only on a subset of the training data (e.g., images for classification or other data samples) associated with the model. Each worker may perform a forward pass on the data to compute an error and then perform a backward pass to calculate the gradient for each parameter (e.g., each weight). Gradient optimization system 500 may further include a host 560 coupled via a bus 528 to high-speed bus bridge 520.

With continued reference to FIG. 5, in one example, high-speed bus bridge 520 may be implemented as a Peripheral Component Interconnect express (PCIe) bridge. WORKER_1 502 may be connected via a PCIe link 510 to high-speed bus bridge 520. WORKER_2 504 may be connected via a PCIe link 512 to high-speed bus bridge 520. WORKER_N 506 may be connected via a PCIe link 514 to high-speed bus bridge 520. HAGO 550 may be coupled to high-speed bus bridge 520 via bus links 522 and 524. Other types of bus bridges and bus links may also be used. In addition, instead of a bus bridge, a switching fabric may also be used. Each worker may compute gradients on a subset of the training data (e.g., a mini-batch) and provide updated gradients via high-speed bus bridge 520 to HAGO 550. HAGO 550 may perform the reduction and optimization on the gradients collected from each of the workers (e.g., WORKER_1 502, WORKER_2 504, and WORKER_N 506). HAGO 550 may operate on data bursts, and, in one example, each burst may consist of a constant number of incoming gradients. The current gradient burst may be buffered while the previous gradient burst is optimized along with its corresponding weights. Although FIG. 5 shows gradient optimization system 500 including a certain number of components, arranged in a certain manner, gradient optimization system 500 may include additional or fewer components arranged differently.

Figure 6:
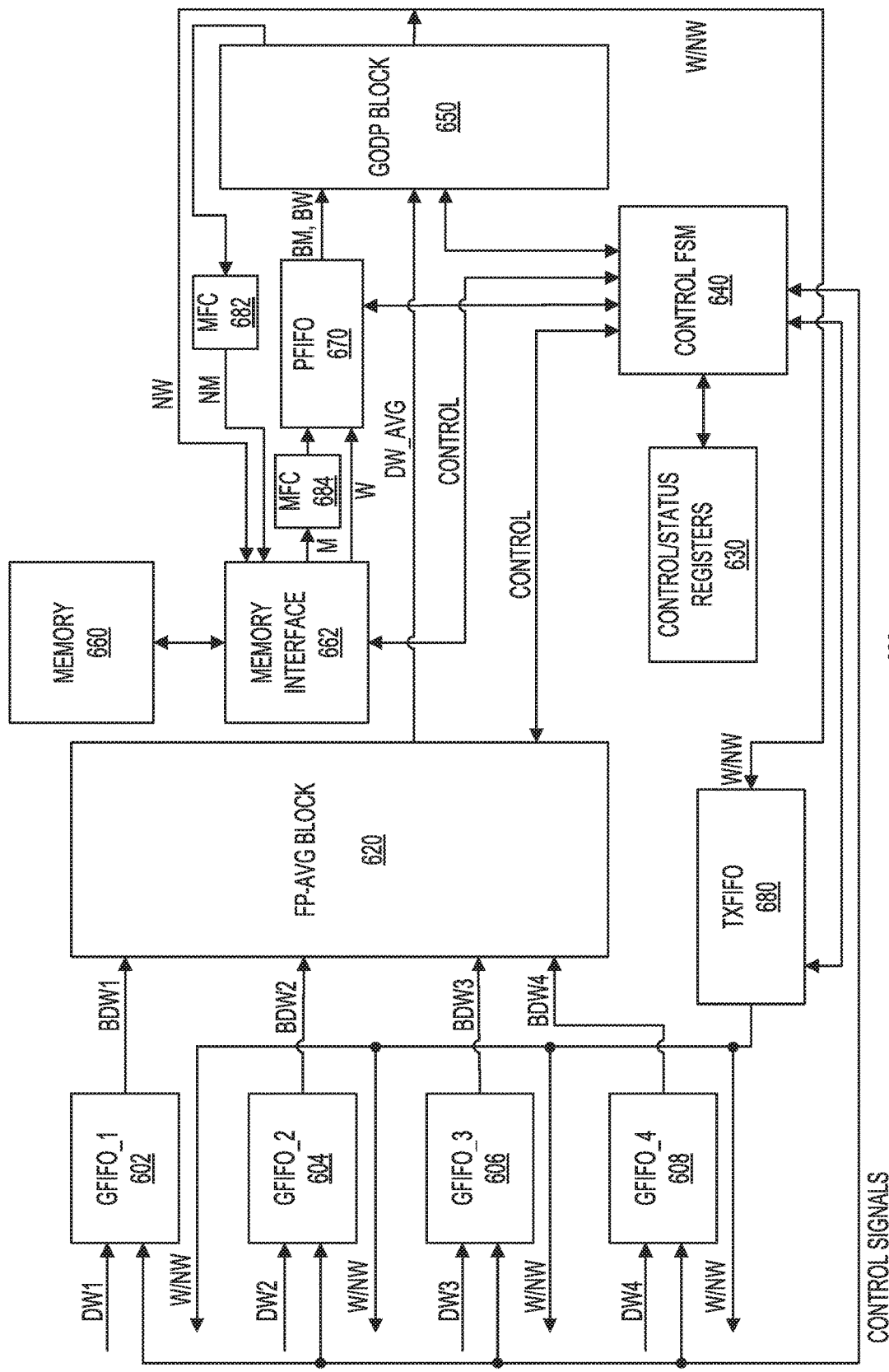
FIG. 6 shows a block diagram of a hardware-assisted gradient optimizer (HAGO), including a dual-momentum gradient optimizer (DMGO), in accordance with one example.

FIG. 6 shows a block diagram of a HAGO 600, including a dual-momentum gradient optimizer, in accordance with one example. In one example, HAGO 550 of FIG. 5 may be implemented as HAGO 600 of FIG. 6. HAGO 600 may receive updated gradients from workers via a high-speed bus. The example in FIG. 6 assumes four workers coupled to HAGO 600. Updated gradients (DW1) from one of the workers may be received via a first-in-first-out block (e.g., GFIFO_1 602). Updated gradients (DW2) from another worker may be received via another first-in-first-out block (e.g., GFIFO_2 604). Updated gradients (DW3) from another worker may be received via another first-in-first-out block (e.g., GFIFO_3 606). Updated gradients (DW4) from another worker may be received via another first-in-first-out block (e.g., GFIFO_4 608). The FIFOs may be implemented as a single multi-entry FIFO or multiple single-entry FIFOs.

With continued reference to FIG. 6, HAGO 600 may further include a floating-point averaging block (e.g., FP-AVG block 620). FP-AVG block 620 may receive buffered updated gradients from the first-in-first-out blocks. As an example, FP-AVG block 620 may receive buffered updated gradients (BDW1) from GFIFO_1 602. FP-AVG block 620 may also receive buffered updated gradients (BDW2) from GFIFO_2 604. FP-AVG block 620 may also receive buffered updated gradients (BDW3) from GFIFO_3 606. FP-AVG block 620 may also receive buffered updated gradients (BDW4) from GFIFO_4 608. FP-AVG block 620 may perform a reduction on the received updated gradients. In this example, the reduction operation may include averaging the received gradients and generating DW_AVG as the output. The reduction operation is not limited to averaging. Reduction may be performed using other operations such as summation or scaled-summation. The output from FP-AVG block 620 may be provided to gradient optimizer data path (GODP) block 650, which performs the floating-point arithmetic to implement the gradient optimization algorithm, such as the one described earlier with respect to FIGS. 1 and 2. In one example, FP-AVG block 620 and GODP block 650 may be implemented as part of an FPGA.

Still referring to FIG. 6, the master copy of the weights (W) and the optional momentum (M) may be stored in memory 660. In one example, memory 660 may be implemented using Double Data Rate (DDR) Dynamic Random Access Memory (DRAM). Memory 660 may be coupled via a memory interface 662 to a first-in-first-out block (e.g., PFIFO block 670). Memory interface 662 may be a DDR interface. As shown in FIG. 6, the model's weights (W) may be loaded into PFIFO 670 under the control of a control finite state machine (FSM) (e.g., control FSM 640). In addition, memory 660 may be coupled via memory interface 662 to a momentum format converter (MFC) 684. MFC 684 may provide similar functionality as described earlier with respect to MFC 130 of FIG. 1. The output of MFC 684 may be coupled to PFIFO 670 (or another FIFO).

In one example, at the same time, control FSM 640 both: (1) enables each worker to transmit the respective locally computed gradients (e.g., DW1, DW2, DW3, and DW4) to a respective GFIFO (e.g., GFIFO_1 602, GFIFO_2 604, GFIFO_3 606, and GFIFO_4 608), and (2) enables memory interface 662 to fetch the same number of parameters (e.g., weights (W)), with optional momentum, from memory 660 to PFIFO 670. Thus, in this example, control FSM 640 controls memory interface 662 to fetch the same number of weights into PFIFO 670 as the number of gradients that are injected into a GFIFO during a single burst cycle. As each of these FIFOs reach the burst size, their respective read port is activated by control FSM 640 to output the contents of the respective FIFO with a single-cycle latency. In this example, control FSM 640 enables readout of the weights from PFIFO 670 and the GFIFOs such that the data from these buffers is flushed out with the same latency. Thus, the readout of the data is fully aligned.

With continued reference to FIG. 6, this implementation ensures that the four gradient outputs (e.g., BDW1, BDW2, BDW3, and BDW4) from the respective FIFOs would have the same positioning index. FP-AVG block 620 then calculates the average of these gradients (e.g., BDW1, BDW2, BDW3, and BDW4) to generate the reduced gradients (e.g., DW_AVG), which is next processed along with the buffered weights and momentum by GODP block 650. In this example, the output of GODP block 650 may contain two parts: new weights (NW) and new momentum (NM), which are both written back to memory 660 via memory interface 662. The new momentum values may be provided to MFC 682, which may implement similar functionality as described earlier with respect to MFC 140 of FIG. 1. Thus, in this manner, compressed momentum values may be stored in a storage format that requires less storage space.

Moreover, simultaneously new weights (NW) are injected into a transmit FIFO (TXFIFO) that sends the new weights back to the workers. In this example, control FSM 640 may control the flow of the weights to the workers via high-speed bus bridge 520 of FIG. 5. As an example, control/status registers 630 may be used to specify the timing associated with the various operations. In addition, control/status registers 630 may also be used to configure the hyperparameters (e.g., the learning rate) of the gradient optimizer.

During the readout from the respective GFIFOs and the weight updates, the next burst of gradients is written into respective GFIFOs. Similarly, the next set of weights and momentum are also fetched from memory 660 into PFIFO 670 (e.g., via MFC 684) during the readout from PFIFO 670 and weight updates. Since, in this example, memory 660 supports only a single data port shared by both read and write operations, the data width of PFIFO 670 is configured to be twice the data width of each of the GFIFOs. This way, in this example, all data bursts, except for the first one and the last one, will have the overlap between the reception of the gradients and the transmission of the new weights.

Still referring to FIG. 6, certain aspects of the operation of HAGO 600 may be controlled using control/status registers along with control FSM 640. Table 1 below shows example contents of control/status registers 630.

TABLE 1

| Register Name | Register Size | Register Description |
|---|---|---|
| ctrl_opt_mode | [1:0] | Selects the optimization algorithm type: Dual-momentum Adam or some other dual-momentum optimization algorithm |
| ctrl_burst_size | [3:0] | Selects the burst size: 4'd8 => 256, 4'd9 => 512, 4'd10 => 1024, 4'd11 => 2048, 4'd12 => 4096 |
| ctrl_param_num | [31:0] | Sets the size of the model's parameters |
| ctrl_init_lr | [31:0] | Sets the optimizer's initial learning rate (FP32 format) |
| ctrl_beta1 | [31:0] | Sets the optimizer's momentum coefficient (FP32 format) |
| ctrl_beta2 | [31:0] | Sets the optimizer's 2nd momentum coefficient (FP32 format) |
| ctrl_is_fp16 | [0:0] | Set if the input gradient's format is FP16 format |

As shown in Table 1, the ctrl_opt_mode register allows one to specify the optimization algorithm type, which may be any dual momentum optimization algorithm. The ctrl_burst_size register allows the selection of burst size associated with each burst cycle. In this example, burst size (e.g., specified in terms of the number of gradients) may be 256 gradients, 512 gradients, 1024 gradients, 2048 gradients, or 4096 gradients. The ctl_param_num register allows one to specify the size of the model's parameters. The ctrl_init_lr register allows one to specify the model's initial learning rate. In one example, the initial learning rate may relate to the step size of the model. As explained earlier, in one example, the optimization algorithm may be a dual-momentum Adam algorithm, which can be represented by the following equations:

$$v_t := \beta_1 \cdot v_t + (1 - \beta_1) \cdot dw$$

$$s_t := \beta_2 \cdot s_t + (1 - \beta_2) \cdot dw^2$$

$$w := w - \frac{\alpha v_t}{\sqrt{s_t} + \epsilon}$$

where $v_t$, $s_t$ are the two momentums, w is the model weight, dw is the gradient, $\alpha$ is the initial learning rate, and e is a tiny value for better numerical stability. The ctrl_beta1 register allows one to specify the momentum's coefficient, which may control an acceleration associated with the rate at which the weights are updated. The ctrl_beta2 register allows one to specify a second momentum's coefficient, which may further control an acceleration associated with the rate at which the weights are updated. The ctrl_is_fp16 register is set if the input gradient's format is FP16 format. Although Table 1 shows a certain set of registers included as part of control/status registers 630, additional or fewer registers may be used with HAGO 600. In addition, at least some or all of the control information included in control/status registers 630 may be specified via the fields or operands associated with the instructions associated with gradient optimization using HAGO 600. Although FIG. 6 shows HAGO 600 including a certain number of components, arranged in a certain manner, HAGO 600 may include additional or fewer components arranged differently. As an example, more than four workers may be coupled to HAGO 600.

Figure 7:
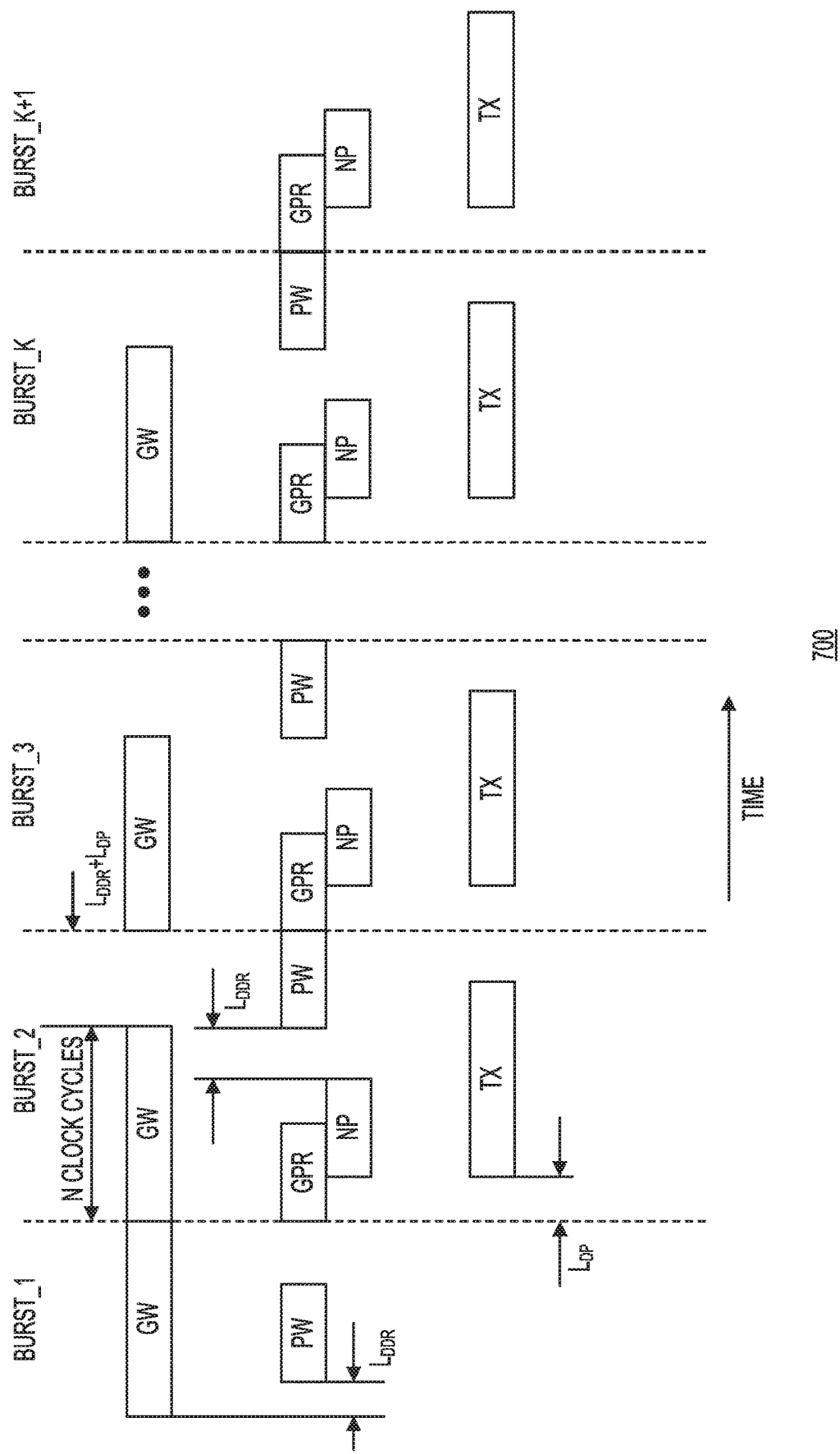
FIG. 7 shows a timing diagram associated with the HAGO of FIG. 6 in accordance with one example.

FIG. 7 shows a timing diagram 700 associated with the HAGO 600 of FIG. 6 in accordance with one example. Timing diagram 700 explains the operation of HAGO 600 in terms of bursts. Timing diagram 700 shows K+1 burst cycles, where K is a positive integer. The first burst cycle (BURST_1) and the last burst cycle (BURST_K+1) include less overlap than the other burst cycles: BURST_2 to BURST_K cycles. BURST_1 cycle includes the timing (GW) involved with the initiation of the transmission of gradients (e.g., DW1) from a worker up to the injection of the gradients into a FIFO (e.g., GFIFO_1 602 of FIG. 6) up to the burst size of the FIFO. Multiple workers (e.g., WORKER_1 502, WORKER_2 504, and WORKER_N 506 of FIG. 5) can inject the gradients into a FIFO up to the burst size of the FIFO during BURST_1 cycle. BURST_1 cycle further includes the timing (PW) involved with the initiation of the transfer of parameters (e.g., model's weights) stored in a memory (e.g., memory 660 of FIG. 6) up to the injection of the weights into PFIFO 670 of FIG. 6. As shown in FIG. 7, the transfer of weights is affected by the read latency ($L_{DDR}$) of the memory (e.g., memory 660 of FIG. 6). Thus, in BURST_1 cycle, HAGO 600 overlaps two operations: injection of the gradients into a FIFO and the fetching of the weights from the memory.

With continued reference to FIG. 7, BURST_2 cycle includes the timing (GW) involved with the initiation of the transmission of the next set of gradients (e.g., DW1) from a worker up to the injection of the gradients into a FIFO (e.g., GFIFO_1 602 of FIG. 6) up to a burst size of the FIFO. Multiple workers (e.g., WORKER_1 502, WORKER_2 504, and WORKER_N 506 of FIG. 5) can inject the gradients into a FIFO up to the burst size of the FIFO during BURST_2 cycle. While the next set of gradients are being injected into the FIFO, BURST 2 cycle also includes the computation cycles, including calculating of the average of the gradients by FP-AVG block 620 and processing of the reduced gradients along with the buffered momentum and the buffered weights (BM, BW) by GODP block 650. The timing involved as part of this operation is labeled as GPR in FIG. 7. The timing involved with writing back the new momentum and the new weights (NM, NW) output from the GODP block 650 to memory 660 is labeled as NP. BURST_2 cycle further includes an overlap of the timing involved with the transmission of new weights to the workers via TXFIFO 680. As shown in timing diagram 700 of FIG. 7, this operation is impacted by the processing latency ($L_{DP}$) of GODP block 650. BURST_2 cycle further includes the timing (PW) involved with the initiation of the transfer of the parameters (e.g., model's weights) stored in a memory (e.g., memory 660 of FIG. 6) up to the injection of the weights into PFIFO 670 of FIG. 6. As shown in FIG. 7, the transfer of weights is affected by the read latency ($L_{DDR}$) of the memory (e.g., memory 660 of FIG. 6). Thus, in BURST_2 cycle, HAGO 600 overlaps, at least partially, four operations as part of the gradient optimization: (1) injection of the gradients into a FIFO (e.g., into any of the GFIFOs), (2) readout of the gradients and the weights from the GFIFO(s) and the PFIFO, (3) writing back of the new weights and the new momentum to the memory, and (4) the transmission of the weights to the workers.

Still referring to FIG. 7, control FSM 640 continues to operate HAGO 600 in a streaming fashion, such that successive burst cycles result in the streaming of gradients through HAGO 600. Thus, BURST_3 cycle includes additional streaming of gradients and overlap of multiple operations, including overlap, at least partially, of four operations as part of the gradient optimization: (1) injection of the gradients into a FIFO (e.g., into any of the GFIFOs), (2) readout of the gradients and the weights from the GFIFO(s) and the PFIFO, (3) writing back of the new weights and the new momentum to the memory, and (4) the transmission of the new weights to the workers. Similarly, BURST_K cycle includes overlap, at least partially, of four operations as part of the gradient optimization: (1) injection of the gradients into a FIFO (e.g., into any of the GFIFOs), (2) readout of the gradients and the weights from the GFIFO(s) and the PFIFO, (3) writing back of the new weights and the new momentum to the memory, and (4) the transmission of the new weights to the workers. BURST_K+1 cycle corresponds to the last burst cycle. Thus, BURST_K+1 cycle includes less overlap than the other burst cycles: BURST_2 to BURST_K cycles. As part of BURST_K+1 cycle, three operations overlap, including: (1) readout of the gradients and the weights from the GFIFO(s) and the PFIFO, (2) writing back of the new weights and the new momentum to the memory, and (3) the transmission of the new weights to the workers.

With continued reference to FIG. 7, during each single burst cycle, HAGO 700 may operate on a gradient burst, and each gradient burst may comprise a fixed number of gradients. The number of gradients operated on during a single burst cycle corresponds to the burst size, which may be configured via control/status registers 630, as explained earlier with respect to FIG. 6.

Figure 8:
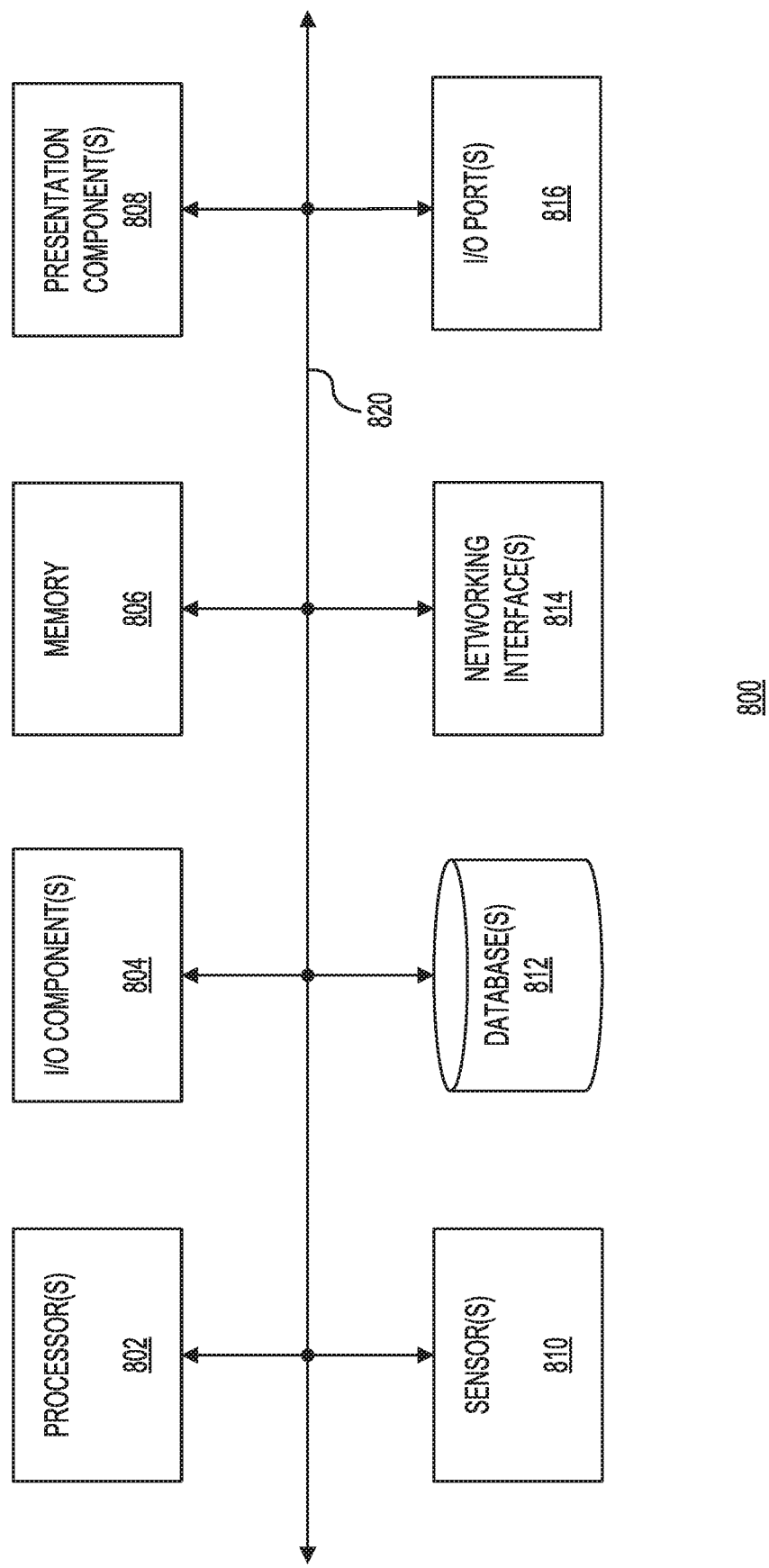
FIG. 8 shows a gradient optimization system in accordance with another example.

FIG. 8 shows a gradient optimization system 800, including a software version of dual-momentum gradient optimizer (DMGO), in accordance with another example. In this example, implementation the logic corresponding to the DMGO (e.g., DMGO 200 of FIG. 2) may be implemented using instructions stored in a memory, when executed by a processor. Gradient optimization system 800 may include a processor(s) 802, I/O component(s) 804, memory 806, presentation component(s) 808, sensors 810, database(s) 812, networking interfaces 814, and I/O port(s) 816, which may be interconnected via bus 820. Processor(s) 802 may execute instructions stored in memory 806. I/O component(s) 804 may include components such as a keyboard, a mouse, a voice recognition processor, or touch screens. Memory 806 may be any combination of non-volatile storage or volatile storage (e.g., flash memory, DRAM, SRAM, or other types of memories). Instructions corresponding to the methods associated with the DMGO may be stored in memory 806 or another memory. These instructions when executed by processor(s) 802, or other processors (e.g., other CPUs or GPUs), may provide the functionality associated with these methods. As an example, instructions, including right-shifting/left-shifting instructions and packing/unpacking instructions may be used to compress or decompress momentum values. Table 2 below shows an example set of instructions, which when executed by processor(s) 802 may perform the functionality corresponding to the DMGO (e.g., DMGO 200 of FIG. 2).

TABLE 2

| Instructions | Comments |
| --- | --- |
| LD R0, R1, #offset | Load addr [R1 + offset] to register R0 |
| UNPACK32_16 R3, R4, R0 | Unpack R0 with two 16-bit momentums to their FP32 version |
| MUL R3, R3, R5 | Perform optimization |
| ... | ... |
| ADD R3, R4, R5 | The new momentums are stored in R3 and R6 |
| ADD R6, R4, R7 | |
| PACK16_32 R0, R3, R6 | Pack two floating point 32 (FP32) momentum values into two block-floating point 16 format (BF16) by truncation and combine them into a single 32-bit word |
| ST R0, R1, #offset | Store the updated momentum values back into the memory |

Still referring to FIG. 8, presentation component(s) 808 may include displays, holographic devices, or other presentation devices. Displays may be any type of display, such as LCD, LED, or other types of display. Database(s) 812 may be used to store data, as needed for the performance of methods described herein. Database(s) 812 may be implemented as a collection of distributed databases or as a single database. Network interface(s) 814 may include communication interfaces, such as Ethernet, cellular radio, Bluetooth radio, UWB radio, or other types of wireless or wired communication interfaces. I/O port(s) 816 may include Ethernet ports, Fiber-optic ports, wireless ports, or other communication ports. Although FIG. 8 shows gradient optimization system 800 as including a certain number of components arranged and coupled in a certain way, it may include fewer or additional components arranged and coupled differently. In addition, the functionality associated with system 800 may be distributed, as needed.

Figure 9:
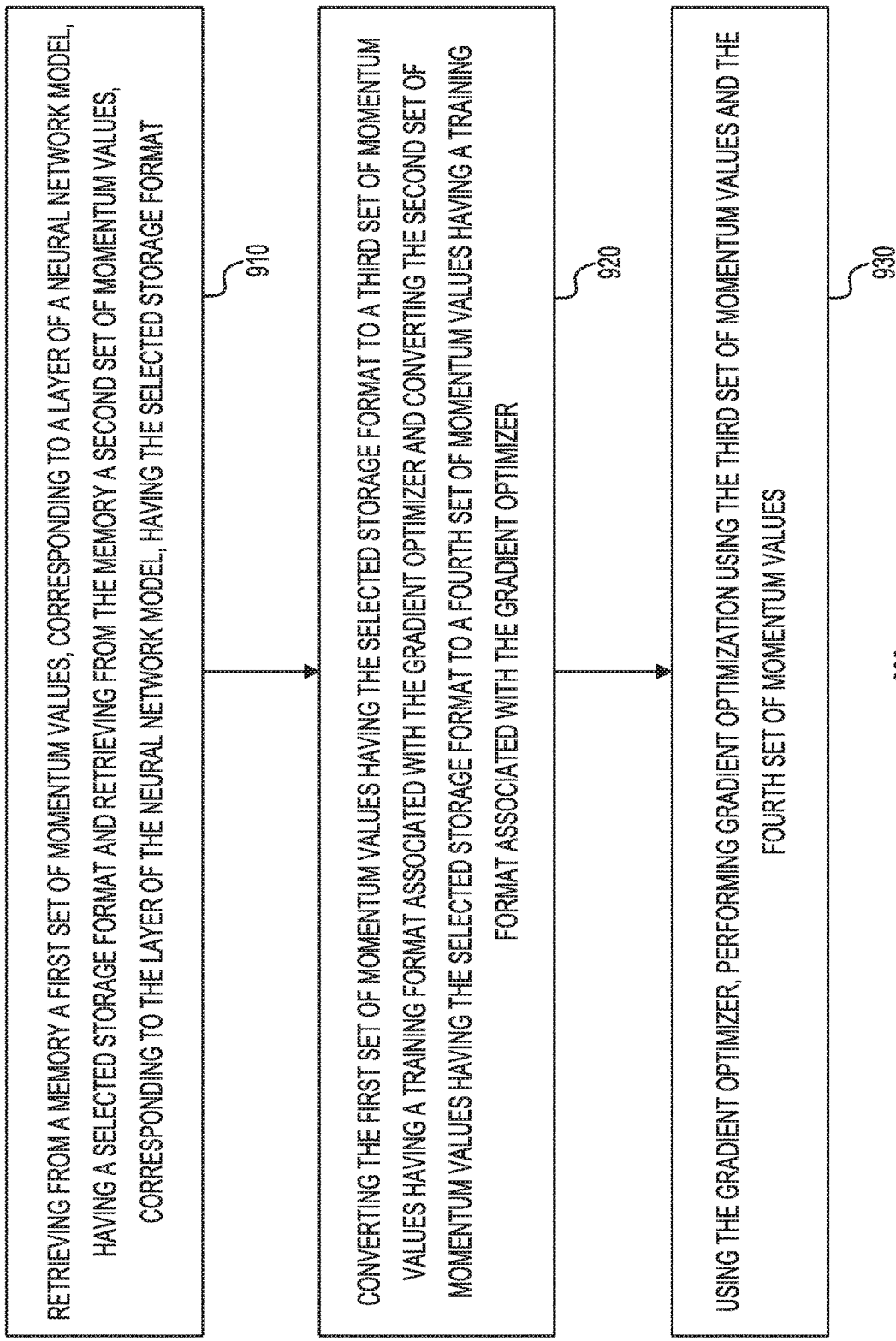
FIG. 9 shows a flow diagram of a method for a dual-momentum gradient optimizer (DMGO) in accordance with one example.

FIG. 9 shows a flow diagram 900 of a method for gradient optimization in accordance with one example. This method may be performed using AITS 100 of FIG. 1, DMGO 200 of FIG. 2, or gradient optimization system 800 of FIG. 8. Thus, as an example when DMGO 200 is implemented as part of HAGO 600, based on control signals received from control FSM 640, steps corresponding to this method may be performed. In addition, although not shown in FIG. 6, clock signals may be used to synchronize the timing associated with the operations performed as part of this method.

Alternatively, instructions stored in memory 806, when executed by processor(s) 802 may be used to perform the steps associated with this method. In addition, a modified combination of DMGO 200 and gradient optimization system 800 may also be used. Thus, as an example, while the momentum compression and decompression steps may be performed using instructions stored in a memory, the gradient optimization may be performed using hardware-logic associated with DMGO 200. Step 910 may include retrieving from the memory a first set of momentum values, corresponding to a layer of the neural network model, having a selected storage format and retrieving a second set of momentum values from the memory, corresponding to the layer of the neural network model, having the selected storage format. As explained earlier, the storage format may correspond to a reduced-precision format.

Step 920 may include converting the first set of momentum values having the selected storage format to a third set of momentum values having a training format associated with the gradient optimizer and converting the second set of momentum values having the selected storage format to a fourth set of momentum values having a training format associated with the gradient optimizer. As explained earlier, this step may include decompressing the momentum values by padding extra zero bits to the momentum values in the storage format. The extra zero bits that are added may depend on the number of bits that were truncated as part of compressing the momentum values.

Step 930 may include using the gradient optimizer, performing gradient optimization using the third set of momentum values and the fourth set of momentum values. After the calculations associated with gradient optimization, the momentum values may be converted into the storage format. As explained earlier, this step may include storing only the sign bits and the seven most-significant bits (MSBs) of the single-precision format momentum values. Although FIG. 9 describes a certain number of steps performed in a certain order, additional or fewer steps in a different order may be performed.

FIG. 10 shows a flow diagram 1000 of a method for gradient optimization in accordance with one example. This method may be performed using AITS 100 of FIG. 1, DMGO 200 of FIG. 2, or gradient optimization system 800 of FIG. 8. Thus, as an example when DMGO 200 is implemented as part of HAGO 600, based on control signals received from control FSM 640, steps corresponding to this method may be performed. In addition, although not shown in FIG. 6, clock signals may be used to synchronize the timing associated with the operations performed as part of this method. Alternatively, instructions stored in memory 806, when executed by processor(s) 802 may be used to perform the steps associated with this method. In addition, a modified combination of DMGO 200 and gradient optimization system 800 may also be used. Thus, as an example, while the momentum compression and decompression steps may be performed using instructions stored in a memory, the gradient optimization may be performed using hardware-logic associated with DMGO 200. Step 1010 may include retrieving from a memory a first set of momentum values, corresponding to a layer of the neural network model, having a selected storage format and retrieving from the memory a second set of momentum values, corresponding to the layer of the neural network model, having the selected storage format. As explained earlier, the storage format may correspond to a reduced-precision format.

Step 1020 may include converting the first set of momentum values having the selected storage format to a third set of momentum values having a training format associated with the gradient optimizer and converting the second set of momentum values having the selected storage format to a fourth set of momentum values having a training format associated with the gradient optimizer. As explained earlier, this step may include decompressing the momentum values by padding extra zero bits to the momentum values in the storage format. The extra zero bits that are added may depend on the number of bits that were truncated as part of compressing the momentum values. As explained earlier, this step may be performed using instructions stored in a (e.g., memory 806 of FIG. 8), when executed by a processor (e.g., processor(s) 802 of FIG. 8). Alternatively, this step may be performed using the logic associated with DMGO 200 of FIG. 2.

Step 1030 may include using the gradient optimizer, performing gradient optimization using the third set of momentum values and the fourth set of momentum values. As explained earlier, this step may be performed using instructions stored in a (e.g., memory 806 of FIG. 8), when executed by a processor (e.g., processor(s) 802 of FIG. 8). Alternatively, this step may be performed using the logic associated with DMGO 200 of FIG. 2.

Step 1040 may include generating a fifth set of momentum values and a sixth set of momentum values for a next iteration of gradient optimization. As explained earlier, this step may be performed using instructions stored in a (e.g., memory 806 of FIG. 8), when executed by a processor (e.g., processor(s) 802 of FIG. 8). Alternatively, this step may be performed using the logic associated with DMGO 200 of FIG. 2.

Step 1050 may include converting the fifth set of momentum values into a seventh set of momentum values having the storage format by storing only the sign bit and truncating a predetermined number of bits associated with a mantissa of the fifth set of momentum values. As explained earlier, this step may include storing only the sign bits and the seven most-significant bits (MSBs) of the single-precision format momentum values. As explained earlier, this step may be performed using instructions stored in a (e.g., memory 806 of FIG. 8), when executed by a processor (e.g., processor(s) 802 of FIG. 8). Alternatively, this step may be performed using the logic associated with DMGO 200 of FIG. 2.

Step 1060 may include converting the sixth set of momentum values into an eighth set of momentum values having the storage format by storing only the sign bit and truncating the predetermined number of bits associated with a mantissa of the sixth set of momentum values. As explained earlier, this step may include storing only the sign bits and the seven most-significant bits (MSBs) of the single-precision format momentum values. As explained earlier, this step may be performed using instructions stored in a (e.g., memory 806 of FIG. 8), when executed by a processor (e.g., processor(s) 802 of FIG. 8). Alternatively, this step may be performed using the logic associated with DMGO 200 of FIG. 2. Although FIG. 10 describes a certain number of steps performed in a certain order, additional or fewer steps in a different order may be performed.

In conclusion, the present disclosure relates to a method in a system comprising a gradient optimizer and a memory configured to store momentum values associated with a neural network model comprising L layers, where L is an integer greater than one. The method may include retrieving from the memory a first set of momentum values, corresponding to a layer of the neural network model, having a selected storage format and retrieving a second set of momentum values from the memory, corresponding to the layer of the neural network model, having the selected storage format. The method may further include converting the first set of momentum values having the selected storage format to a third set of momentum values having a training format associated with the gradient optimizer and converting the second set of momentum values having the selected storage format to a fourth set of momentum values having a training format associated with the gradient optimizer. The method may further include using the gradient optimizer, performing gradient optimization using the third set of momentum values and the fourth set of momentum values.

The selected storage format may comprise a reduced single-precision format. The training format may comprise a single-precision format or a double-precision format.

The converting the first set of momentum values having the selected storage format to the third set of momentum values having the training format may comprise padding extra zero bits to form single-precision format momentum values. The method may further include generating a fifth set of momentum values and a sixth set of momentum values for a next iteration of gradient optimization and prior to storing each of the fifth set of momentum values and the sixth set of momentum values converting each of the fifth set of momentum values and the sixth set of momentum values into the storage format by storing only the sign bit and seven most-significant bits associated with each of respective momentum values.

The step of performing gradient optimization comprises implementing an adaptive moment estimation algorithm. The gradient optimizer may be implemented using a field programmable gate array (FPGA), and the gradient optimizer may be configured to operate in a burst mode such that successive burst cycles result in streaming of gradients through the gradient optimizer.

In another example, the present disclosure relates to a system including a gradient optimizer. The system may include a memory configured to store momentum values associated with a neural network model comprising L layers, where L is an integer greater than one. The system may be configured to: (1) retrieve from the memory a first set of momentum values, corresponding to a layer of the neural network model, having a selected storage format and retrieve a second set of momentum values from the memory, corresponding to the layer of the neural network model, having the selected storage format, (2) convert the first set of momentum values having the selected storage format to a third set of momentum values having a training format associated with the gradient optimizer and converting the second set of momentum values having the selected storage format to a fourth set of momentum values having a training format associated with the gradient optimizer, and (3) using the gradient optimizer, perform gradient optimization using the third set of momentum values and the fourth set of momentum values.

The selected storage format may comprise a reduced single-precision format. The training format may comprise a single-precision format or a double-precision format.

The system may further be configured to pad extra zero bits to form single-precision format momentum values or double-precision format momentum values. The system may further be configured to generate a fifth set of momentum values and a sixth set of momentum values for a next iteration of gradient optimization and prior to storing each of the fifth set of momentum values and the sixth set of momentum values convert each of the fifth set of momentum values and the sixth set of momentum values into the storage format by storing only the sign bit and seven most-significant bits associated with each of respective momentum values.

The system may be configured to implement an adaptive moment estimation algorithm. The gradient optimizer may be implemented using a field programmable gate array (FPGA), and the gradient optimizer may be configured to operate in a burst mode such that successive burst cycles result in streaming of gradients through the gradient optimizer.

In yet another example, the present disclosure relates to a method in a system comprising a gradient optimizer and a memory configured to store weights and momentum values associated with a neural network model comprising L layers, where L is an integer greater than one. The method may further include retrieving from the memory a first set of momentum values, corresponding to a layer of the neural network model, having a selected storage format and retrieving from the memory a second set of momentum values, corresponding to the layer of the neural network model, having the selected storage format. The method may further include converting the first set of momentum values having the selected storage format to a third set of momentum values having a training format associated with the gradient optimizer and converting the second set of momentum values having the selected storage format to a fourth set of momentum values having a training format associated with the gradient optimizer. The method may further include using the gradient optimizer, performing gradient optimization using the third set of momentum values and the fourth set of momentum values. The method may further include generating a fifth set of momentum values and a sixth set of momentum values for a next iteration of gradient optimization. The method may further include converting the fifth set of momentum values into a seventh set of momentum values having the storage format by storing only the sign bit and truncating a predetermined number of bits associated with a mantissa of the fifth set of momentum values. The method may further include converting the sixth set of momentum values into an eighth set of momentum values having the storage format by storing only the sign bit and truncating the predetermined number of bits associated with a mantissa of the sixth set of momentum values.

The selected storage format may comprise a reduced single-precision format. The training format may comprise a single-precision format or a double-precision format. In the method, the step of performing gradient optimization may comprise implementing an adaptive moment estimation algorithm.

The training format may comprise 32-bit floating point format and the storage format may comprise 8-bit floating point format. The gradient optimizer may be implemented using a field programmable gate array (FPGA), and the gradient optimizer may be configured to operate in a burst mode such that successive burst cycles result in streaming of gradients through the gradient optimizer.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with, transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a system comprising a gradient optimizer and a memory configured to store momentum values associated with a neural network model comprising L layers, wherein L is an integer greater than one, the method comprising:
retrieving from the memory a first set of momentum values, corresponding to a layer of the neural network model, having a selected storage format and retrieving a second set of momentum values from the memory, corresponding to the layer of the neural network model, having the selected storage format;
converting the first set of momentum values having the selected storage format to a third set of momentum values having a training format associated with the gradient optimizer and converting the second set of momentum values having the selected storage format to a fourth set of momentum values having a training format associated with the gradient optimizer; and
using the gradient optimizer, performing gradient optimization using the third set of momentum values and the fourth set of momentum values, wherein the gradient optimizer is configured to operate in a burst mode such that successive burst cycles result in streaming of gradients through the gradient optimizer.

2. The method of claim 1, wherein the selected storage format comprises a reduced single-precision format.

3. The method of claim 1, wherein the training format comprises a single-precision format or a double-precision format.

4. The method of claim 1, wherein the converting the first set of momentum values having the selected storage format to the third set of momentum values having the training format comprises padding extra zero bits to form single-precision format momentum values.

5. The method of claim 1 further comprising generating a fifth set of momentum values and a sixth set of momentum values for a next iteration of gradient optimization and prior to storing each of the fifth set of momentum values and the sixth set of momentum values converting each of the fifth set of momentum values and the sixth set of momentum values into the storage format by storing only the sign bit and seven most-significant bits associated with each of respective momentum values.

6. The method of claim 1, wherein performing gradient optimization comprises implementing an adaptive moment estimation algorithm.

7. The method of claim 6, wherein the gradient optimizer is implemented using a field programmable gate array (FPGA).

8. A system, including a gradient optimizer, comprising:
a memory configured to store momentum values associated with a neural network model comprising L layers, wherein L is an integer greater than one; and
the system configured to:
retrieve from the memory a first set of momentum values, corresponding to a layer of the neural network model, having a selected storage format and retrieve a second set of momentum values from the memory, corresponding to the layer of the neural network model, having the selected storage format,
convert the first set of momentum values having the selected storage format to a third set of momentum values having a training format associated with the gradient optimizer and convert the second set of momentum values having the selected storage format to a fourth set of momentum values having a training format associated with the gradient optimizer, and using the gradient optimizer, perform gradient optimization using the third set of momentum values and the fourth set of momentum values, wherein the gradient optimizer is configured to operate in a burst mode such that successive burst cycles result in streaming of gradients through the gradient optimizer.

9. The system of claim 8, wherein the selected storage format comprises a reduced single-precision format.

10. The system of claim 8, wherein the training format comprises a single-precision format or a double-precision format.

11. The system of claim 10, wherein the system is further configured to pad extra zero bits to form single-precision format momentum values or double-precision format momentum values.

12. The system of claim 8, wherein the system is further configured to generate a fifth set of momentum values and a sixth set of momentum values for a next iteration of gradient optimization, and wherein the system is further configured to, prior to storing each of the fifth set of momentum values and the sixth set of momentum values convert each of the fifth set of momentum values and the sixth set of momentum values into the storage format by storing only the sign bit and seven most-significant bits associated with each of respective momentum values.

13. The system of claim 8, wherein the system is configured to implement an adaptive moment estimation algorithm.

14. The system of claim 8, wherein the gradient optimizer is implemented using a field programmable gate array (FPGA).

15. A method in a system comprising a gradient optimizer and a memory configured to store weights and momentum values associated with a neural network model comprising L layers, wherein L is an integer greater than one, the method comprising:

retrieving from the memory a first set of momentum values, corresponding to a layer of the neural network model, having a selected storage format and retrieving from the memory a second set of momentum values, corresponding to the layer of the neural network model, having the selected storage format;

converting the first set of momentum values having the selected storage format to a third set of momentum values having a training format associated with the gradient optimizer and converting the second set of momentum values having the selected storage format to a fourth set of momentum values having a training format associated with the gradient optimizer;

using the gradient optimizer, performing gradient optimization using the third set of momentum values and the fourth set of momentum values;

generating a fifth set of momentum values and a sixth set of momentum values for a next iteration of gradient optimization;

converting the fifth set of momentum values into a seventh set of momentum values having the storage format by storing only the sign bit and truncating a predetermined number of bits associated with a mantissa of the fifth set of momentum values; and converting the sixth set of momentum values into an eighth set of momentum values having the storage format by storing only the sign bit and truncating the predetermined number of bits associated with a mantissa of the sixth set of momentum values, wherein the gradient optimizer is configured to operate in a burst mode such that successive burst cycles result in streaming of gradients through the gradient optimizer.

16. The method of claim 15, wherein the selected storage format comprises reduced single-precision format.

17. The method of claim 15, wherein the training format comprises single-precision format or double-precision format.

18. The method of claim 15, wherein performing gradient optimization comprises implementing an adaptive moment estimation algorithm.

19. The method of claim 15, wherein the training format comprises 32-bit floating point format and wherein the storage format comprises 8-bit floating point format.

20. The method of claim 15, wherein the gradient optimizer is implemented using a field programmable gate array (FPGA).

* * * * *